July 29, 1969
P. J. ALLSOPP
3,458,004
WEIGH-FEEDERS
Filed July 26, 1967
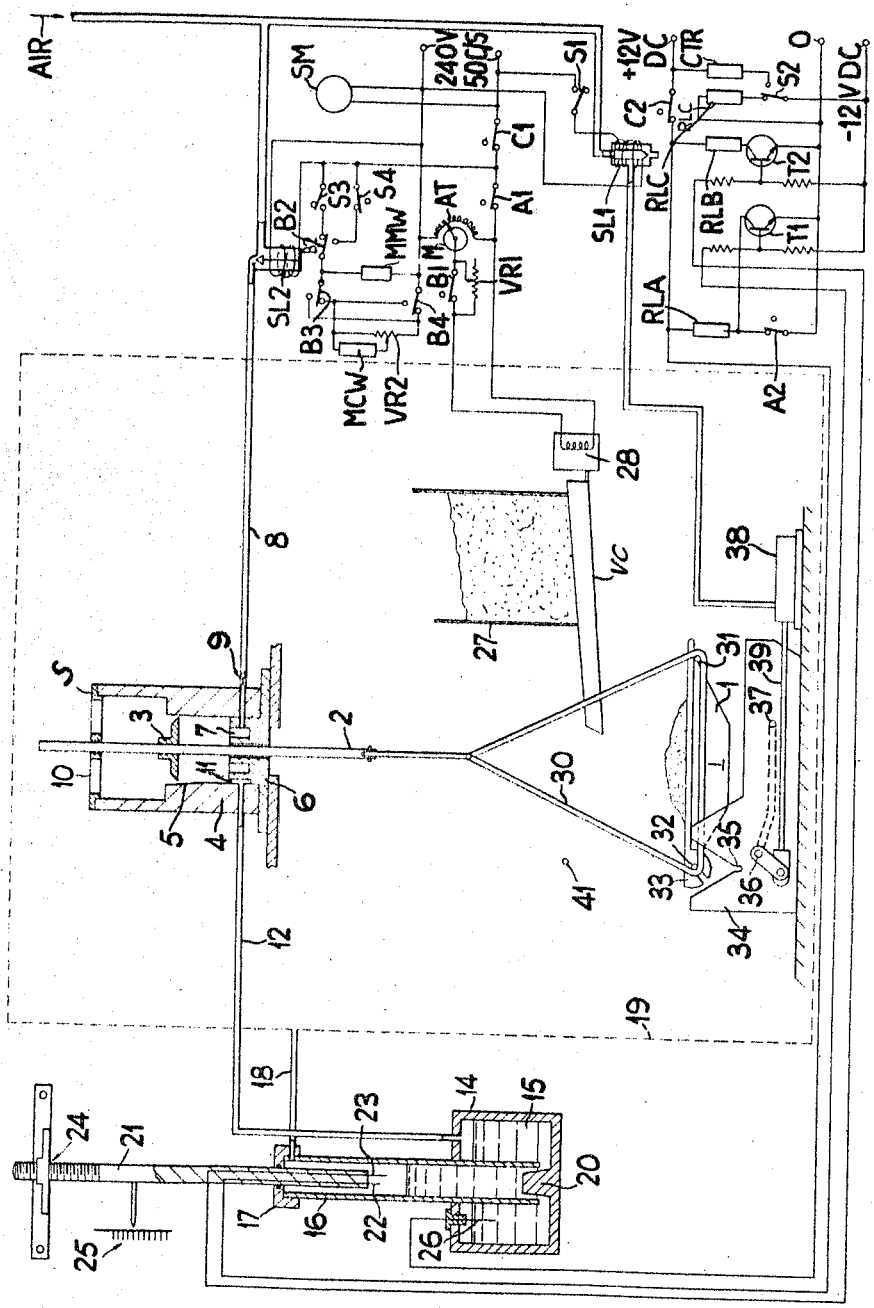

United States Patent Office 3,458,004
Patented July 29, 1969

3,458,004
WEIGH-FEEDERS
Peter James Allsopp, Streatley, England, assignor to United Kingdom Atomic Energy Authority, London, England
Filed July 26, 1967, Ser. No. 656,089
Claims priority, application Great Britain, Aug. 4, 1966, 34,933/66
Int. Cl. G01g 13/02
U.S. Cl. 177—116     7 Claims

ABSTRACT OF THE DISCLOSURE

A weigh-feeder suitable for powders comprises a weigh-pan suspended from a piston moveable in a downwardly tapered cylinder to provide a variable leak between piston and cylinder wall, the cylinder having a port at its lower end for admitting gas under pressure to oppose the weight of the pan, and a pneumatic switch, preferably of the mercury manometer type, connected to operate when the gas pressure below the piston exceeds a predetermined value, the switch being arranged to interrupt the supply of powder to the pan when the switch operates. Thereafter the pan is tipped to discharge the powder.

BACKGROUND OF THE INVENTION

This invention relates to weigh-feeders.

Weigh-feeders are used to deliver materials from a store or hopper at a predetermined rate. The material is fed from the hopper, e.g. by a vibratory conveyor, to the weigh pan of a scale. When the mass of material on the pan reaches a predetermined value, the conveyor is automatically stopped, and the pan discharged, e.g. by tipping, after which the conveyor is restarted to repeat the cycle. As the cycling rate is also predetermined, the weigh-feeder delivers the material, as successive batches, at a predetermined average rate.

The accuracy of the average rate of delivery depends on maintaining the weight of each successive batch within close limits, and this depends both on the accuracy of the scale and on ensuring that the feed from the hopper is stopped immediately the predetermined weight is reached.

It is an object of the present invention to provide a weigh-feeder having a highly accurate average rate of delivery.

SUMMARY OF THE INVENTION

According to the present invention a weigh-feeder comprises a weigh pan suspended from a piston moveable in a cylinder, said cylinder having a port for admitting gas under pressure to one side of the piston to oppose the weight of the pan, a variable leak controlled by the position of the piston in the cylinder to cause a decreasing flow of gas to by-pass the piston as the piston moves towards said port, and a pneumatic switch connected to operate when the gas pressure at said side of the piston exceeds a predetermined value, said switch being arranged to interrupt the supply of material to the pan when the switch operates.

Preferably at least a portion of the cylinder tapers towards said port, the variable leak being formed between the periphery of the piston and the tapering wall of the cylinder.

Preferably the pneumatic switch comprises a mercury manometer whereof the mercury surface in one arm is subjected to the gas pressure at one side of the piston and the surface in the other arm to the gas pressure at the other side of the piston, and at least two contacts arranged to be bridged by the mercury when the pressure difference between the surfaces exceeds a predetermined value.

Preferably the cylinder is oriented so that the piston moves vertically and the port is located below the piston.

The feeder may also comprise a cradle located below the pan, said pneumatic switch being arranged, on operation, to interrupt the supply of gas so that the pan falls on to the cradle, and means for thereafter rotating the pan about a horizontal axis to discharge the material from the pan.

The present invention also provides a weight-measuring unit comprising a piston moveable in a cylinder having a port for admitting gas under pressure to one side of the piston, at least a portion of the cylinder tapering towards said port so that a variable leak is formed between the periphery of the piston and the cylinder, the leak decreasing as the piston moves towards the port.

DESCRIPTION OF THE DRAWINGS

To enable the nature of the present invention to be more readily understood, attention is directed, by way of example, to the accompanying drawing, which is a semi-schematic vertical section of an embodiment of the invention.

DESCRIPTION OF PREFERRED EMBODIMENT

In this drawing a weigh pan 1 is suspended from a rod 2 carrying a piston 3 which is free to move vertically in a cylinder 4 having an upper portion 5 which has a small downward taper. The bottom of the cylinder is sealed by a plug 6 having an annular gas inlet port 7, which communicates with an inlet pipe 8 containing a fixed flow restrictor 9. Rod 2 is a clearance fit in plug 6, and has its upper end similiarly located by a spider S having large apertures 10. As the present embodiment is intended for use with toxic materials, the above-described components are enclosed in a sealed compartment 19 of the familiar glove-box type.

A small peripheral recess 11 in plug 6 forms a gas-pressure sampling port and is connected by a pipe 12 to an external closed cylindrical vessel 14 containing mercury 15. A tube 16 having its upper end sealed by a cap 17 is suspended within vessel 14, the mercury within vessel 14 and tube 16 forming respectively the two arms of a mercury manometer. The upper end of tube 16 is connected via a pipe 18 to the compartment 19 and the mercury surface in tube 16 is therefore subjected to the pressure above piston 3, which is normally approximately atmospheric. The mercury surface in vessel 14 is subjected via pipe 12 to the pressure below piston 3. A tapered flow restrictor 20 extends into the bottom of tube 16 to damp movements of the mercury.

Extending through a gas-tight seal in cap 17 is a vertically adjustable insulating rod 21 from the lower end of which extend upper and lower platinum wire contacts 22 and 23 respectively. The upper end of rod 21 terminates in a nut and screw assembly 24 to provide the vertical adjustment, which is indicated on a scale 25. A third wire contact 26 is sealed into vessel 14 to permanently contact the mercury.

Also located within container 19 is a conventional vibratory conveyor VC arranged to feed particulate material from a hopper 27 to the pan 1 and driven by a coil 28.

The arrangements for discharging the pan 1 are as follows. The pan is suspended from rod 2 by a wire cage comprising two side-members 30 (only one of which is shown in the drawing) and two cross-members 31 and 32 whose ends project beyond the side-members. Member 31 engages the lip of the pan, and member 32 engages slots in a pair of cheeks 33 extending downward from the pan lip (only one of which is shown). Below the pan 1 is located a cradle comprising a pair of side-members 34 (of which only one is shown), each having a vertical slot 35 aligned to locate the projecting ends of cross-member 32 when the cage is lowered between members 34, the projecting ends of cross-member 31 then resting on the top edges of side-members 34.

Between the two side-members 34 is an approximately rectangular wire lever connected to a shaft 36. The cross-member 37 of this lever remote from the shaft engages the under surface of pan 1 when the pan is lowered. The shaft 36 can be rotated approximately 90° anti-clockwise from the position shown by a pneumatic ram 38 operating through a linkage 39, and restored to its rest position by a coil spring (not shown) in the ram 38. Rotation of the shaft 36 causes cross-member 37 to pivot the pan about an axis formed by cross-member 32 until the pan is approximately vertical thus discharging the contents. Ejection of the pan from the cage is restrained by a spring cross-wire 41 suspended between supports (not shown), which is struck by the lip of the pan after rotation through about 90°. The pan returns to the horizontal by gravity when lever member 37 is restored to its rest position.

The control system for the described embodiment comprises a 1 r.p.m. synchronous motor SM driving four cams (not shown) which operate microswitches S1–S4. The switches are shown with their contacts in positions corresponding to the commencement of the pan-filling portion of the 60 second operating cycle. At the commencement of this portion switch S2 closes, energising relay RLC from a 12 v. supply to close relay contact C1. Relays RLA and RLB are connected in series with the collectors of transistors T1 and T2 respectively, which are biased in the non-conducing state while contacts 22 and 23 respectively are above the mercury level in tube 16. These two relays are thus unenergised and their contacts B1 and A1 are closed, causing coil 28 to be energised from the mains at 50 c./s. via adjustable auto-transformer AT and to feed material from hopper 27 on to pan 1; the adjustable low resistance VR1 is shorted by contact B1.

In this condition solenoid valve SL2 is held open by the mains supply via contact C1, and feeds compressed air from an external supply via restriction 9 to port 7. Relay contact C2 is held closed by relay RLC to apply +12 v. to the mercury 15 via contact 26 and to the transistor circuit.

The pressure of the air in cylinder 4 acting on the under-surface of piston 3 depends on the vertical position of the piston within the tapered portion 5, since the leakage of air past the piston depends on the size of the annular gap between the piston and the cylinder wall, and the pressure drop across constriction 9 increases with the airflow. This air escapes into enclosure 19 via apertures 10. For a given weight of pan and contents, there is thus an equilibrium position of the piston where this weight is balanced by the air pressure on the under-surface of the piston. The use of a piston in a tapered cylinder ensures that changes of the air pressure with piston movement are smooth and gradual. This has a stabilising effect which reduces any tendency to vertical oscillation of the pan.

As material is fed on to the pan by conveyor VC the piston descends, thus reducing the annular gap and increasing the air pressure below the piston. The pressure difference between the lower and upper sides of the piston is applied to the mercury manometer as described, and as the pressure below the piston increases, the mercury rises in tube 16. At a preset position of contact 23, corresponding to the desired weight of material per batch, the contacts 23 and 26 are bridged by the mercury, and relay RLB is energised.

The subsequent sequence of events depends on the time which has elapsed between the closure of S2 and the energising of RLB, and is arranged to ensure automatically that the feed-rate of material from conveyor VC is appropriate to supply the required quantity in the available portion of the cycle. In the present embodiment this portion is 24 secs. out of the total 60 secs. The feed-rate is varied automatically by altering the taping on AT, and hence the power supplied to vibrator 28, by means of a contact driven by a reversible AC motor M having a main winding MMW and a control winding MCW. The control system is as follows.

S3 and S4 are two further microswitches operated by cams driven by motor SM. S3 is open at the commencement of the filling portion of the cycle, as shown, but closes 24 secs. thereafter. S4 is closed at the commencement of the filling portion, as shown, but opens 21 secs. thereafter. There is thus a 3 sec. overlap when S3 and S4 are both open. If RLB becomes energised (i.e. the pan is almost filled) during these 3 secs., contacts B1–B4 change over. At 24 secs. S3 closes, but because B2 has changed over, no power is supplied to winding MMW and MCW and hence the tapping on AT is not altered. This is the correct working condition of the apparatus.

If, however, RLB had become energised *before* 21 secs., S4 would have been closed and current would have been fed via the path S4–B2–B3–MCW–B4 to drive M in a sense to *reduce* the power fed to vibrator 28 and hence reduce the feed-rate of material to the pan.

Similarly, had RLB become energised *after* 24 secs., current would have been fed via the path S3–B2–B3–MCW–B4, but would traverse winding MCW in the opposite direction, driving M in a sense to *increase* the power fed to vibrator 28 and hence increase the feed-rate of material to the pan.

The speed of motor M is preset by the variable resistor VR2. Protective limit switches (not shown) are provided at the ends of the permissible travel of the contact on transformer AT.

Assuming that the apparatus has adjusted itself to the correct working condition as described above, the energising of RLB opens contact B1 and connects preset variable resistor VR1 in series with the winding of vibrator 28. This reduces the feed-rate until the continuing pressure increase causes the mercury to reach the upper contact 22. Contacts 22 and 26 are now bridged by the mercury, causing relay RLA to become energised, which state is maintained by the closure of holding contact A2. Simultaneously contact A1 opens to disconnect the mains supply to vibrator coil 28 and the feed of material ceases.

After 54 secs., microswitch S2 opens, causing RLC to become de-energised and open contact C1. This causes valve SL2 to close, cutting off the air supply to port 7 so that pan 1 falls on to the cradle. A second later (55 secs. from commencement) microswitch S1 closes to energise solenoid valve SL1, thus connecting the compressed air supply to pneumatic ram 38 to discharge the pan as described. At 58 secs. S1 re-opens, de-energising valve SL1 and connecting ram 38 to atmosphere.

At 60 secs. microswitch S2 closes and the pan-filling cycle recommences. S3 opens at 48 secs. and S4 closes at 60 secs.

In one example of the described embodiment, the aluminium alloy pan 1 was approximately 3 inches in length (the dimension shown in the drawing), and 3½ inches wide, weighed about 25 gms. with cage, and was intended for weighing batches of $UO_2$ powder in the range 10 gms. to 30 gms. The piston 3 was of ½ inch diameter and a clearance fit (about 0.002 inch radial clearance) in the right cylindrical lower portion of cylinder 4. The clearance fit prevents friction between piston and cylinder causing a pressure buildup below the piston which would operate the manometer switch, while minimising unwanted leakage past the piston. Rod 2 is a closer but still almost frictionless fit in plug 6 and spider 7 to locate the piston centrally in the cylinder. The total height of the cylinder was 9/16 inch, the upper portion 5 extending over ⅜ inch of this height and having a 1 degree taper.

In this example the constriction 9 was not a separate unit as shown, but was constituted by the pipe 8 itself, which was of 1/16 inch internal diameter and approximately 14 ft. long between the port 7 and the air supply pressure-controller (not shown). The air pressure used was approximately 20 lb./sq. in. If a high pressure is used, say 50 lb./sq. in. or above, the accuracy of measurement becomes largely independent of pressure, but as the pressure falls, the accuracy is affected to a progressively greater extent. For example at 30 lb./sq. in. a 6% change of pressure caused a 1% error in weight. The present pressure-controller, of a known type, has an output controllable between 10 and 30 lb./sq. in. with an accuracy of ±½%.

A counter CTR records the number of revolutions of the motor SM and therefore the number of batches of material delivered by the weigh-feeder.

In contrast with some known pneumatic weighing systems, the present invention permits the pan to be suspended directly from the piston, not from a pivoted beam. Pivots contribute friction and are liable to vibration damage, resulting in inaccuracies. Moreover the comparatively large vertical travel obtainable with the present invention allows the piston to act both as a weight-measuring element and as a jack for raising and lowering the pan between its measuring and discharging levels.

The present invention is particularly suitable for use with agglomerating powders such as $UO_2$, in which the particles tend to stick together owing to surface forces. In systems in which the feed-rate is progressively reduced in proportion to the deviation of the material in the pan from the desired weight per batch, such powders may cease to flow altogether before the desired weight is reached. The present invention allows the feed-rate to be reduced to a finite value as the desired batch weight is approached, which is made sufficient to maintain the flow. Moreover the method of discharge from the pan, in which the latter is rotated rapidly to an approximately vertical position, ensures that agglomerating powders are cleanly ejected. In systems using a discharge-gate in the base of the pan, such powders tend to stick to the sides of the pan.

It will be understood that an arrangement for automatically controlling the feed-rate from the hopper to the weigh-pan, as hereinbefore described, is not an essential feature of the present invention.

I claim:

1. A weigh-feeder comprising a weigh pan suspended from a piston moveable in a cylinder, said cylinder having a port for admitting gas under pressure to one side of the piston to oppose the weight of the pan, a variable leak controlled by the position of the piston in the cylinder to cause a decreasing flow of gas to by-pass the piston as the piston moves towards said port, and a pneumatic switch connected to operate when the gas pressure at said side of the piston exceeds a predetermined value, said switch being arranged to interrupt the supply of material to the pan when the switch operates.

2. A weigh-feeder as claimed in claim 1 wherein at least a portion of the cylinder tapers towards said port, the variable leak being formed between the periphery of the piston and the tapering wall of the cylinder.

3. A weigh-feeder as claimed in claim 1 wherein the pneumatic switch comprises a mercury manometer whereof the mercury surface in one arm is subjected to the gas pressure at one side of the piston and the surface in the other arm to the gas pressure at the other side of the piston, and at least two contacts arranged to be bridged by the mercury when the pressure difference between the surfaces exceeds a predetermined value.

4. A weigh-feeder as claimed in claim 1 wherein the cylinder is oriented so that the piston moves vertically and the port is located below the piston.

5. A weigh-feeder as claimed in claim 1 comprising a cradle located below the pan, said pneumatic switch being arranged, on operation, to interrupt the supply of gas so that the pan falls on to the cradle, and means for thereafter rotating the pan about a horizontal axis to discharge the material from the pan.

6. A weight-measuring unit suitable for use in a weight feeder as claimed in claim 1 comprising a piston moveable in a cylinder having a port for admitting gas under pressure to one side of the piston, at least a portion of the cylinder tapering towards said port so that a variable leak is formed between the periphery of the piston and the cylinder, the leak decreasing as the piston moves towards the port.

7. A weigh-feeder as claimed in claim 1 comprising means for controlling a repetitive time-cycle of pan-filling and pan-discharging operations, said time-cycle including a period for supplying a predetermined weight of material to the pan, said means being adapted to detect whether said predetermined value of gas pressure corresponding to said predetermined weight is exceeded within said period, and to adjust the feed-rate of material to the pan in a sense to ensure that said weight is supplied within said period.

References Cited

UNITED STATES PATENTS

| 3,017,939 | 1/1962 | Vegors | 117—208 |
| 3,091,303 | 5/1963 | Moses et al. | 177—208 |
| 3,115,203 | 12/1963 | Ernst | 177—208 |
| 3,145,794 | 8/1964 | Calongna et al. | 177—208 |
| 3,147,616 | 9/1964 | Rome | 177—208 X |

RICHARD B. WILKINSON, Primary Examiner

GEORGE H. MILLER, JR., Assistant Examiner

U.S. Cl. X.R.

177—208, 254